(12) United States Patent
Maier et al.

(10) Patent No.: US 8,201,878 B2
(45) Date of Patent: Jun. 19, 2012

(54) SEAT ARRANGEMENT COMPRISING TWO VEHICLE SEATS IN A SEAT ROW

(75) Inventors: Jürgen Maier, Weitersweiler (DE); Jens Winter, Gau-Bischofsheim (DE); Thomas Dill, Heiligenmoschel (DE); Heinrich Hammann, Teschenmoschel (DE); Viktor Enns, Kaiserslautern (DE); Ulf Schäffling, Gaugrehweiler (DE)

(73) Assignee: GM Global Technology Operations LLC, Detroit, MI (US)

( * ) Notice: Subject to any disclaimer, the term of this patent is extended or adjusted under 35 U.S.C. 154(b) by 407 days.

(21) Appl. No.: 12/353,468

(22) Filed: Jan. 14, 2009

(65) Prior Publication Data
US 2009/0236885 A1 Sep. 24, 2009

(30) Foreign Application Priority Data
Jan. 14, 2008 (DE) .......................... 10 2008 004 232

(51) Int. Cl.
*A47C 13/00* (2006.01)
(52) U.S. Cl. .................... 297/112; 297/115; 297/232
(58) Field of Classification Search .................. 297/112, 297/113, 115, 125, 188.05, 232, 233, 238
See application file for complete search history.

(56) References Cited

U.S. PATENT DOCUMENTS

| | | | | |
|---|---|---|---|---|
| 1,034,678 A | * | 8/1912 | Berger et al. ................. | 297/112 |
| 2,584,481 A | * | 2/1952 | Mast et al. .................... | 297/115 |
| 3,094,354 A | * | 6/1963 | Bernier ......................... | 297/112 |
| 3,145,052 A | * | 8/1964 | Morgan ........................ | 297/354.1 |
| 4,540,216 A | * | 9/1985 | Hassel, Sr. .................... | 297/238 |
| 5,384,946 A | * | 1/1995 | Sundstedt et al. ............ | 297/238 |
| 5,498,062 A | * | 3/1996 | Holdampf ..................... | 297/238 |
| 5,564,780 A | * | 10/1996 | Presser et al. ................. | 297/238 |

(Continued)

FOREIGN PATENT DOCUMENTS
DE 3937678 A1 5/1990
(Continued)

OTHER PUBLICATIONS

European Patent Office, European Search Report for European Application No. 09000289.0, May 31, 2010.
German Patent Office, German Office Action for Application No. 102008004232.3-14, dated Aug. 14, 2008.

*Primary Examiner* — David Dunn
*Assistant Examiner* — David E Allred
(74) *Attorney, Agent, or Firm* — Ingrassia Fisher & Lorenz, P.C.

(57) ABSTRACT

A seat arrangement is provided that includes, but is not limited to a first and a second vehicle seat, which are disposed adjacent to one another in a seat row and of which the first vehicle seat has a backrest, which can be pivoted from a substantially upright usage position in the seat direction forward into a substantially horizontal non-usage position. The backrest, includes, but is not limited to at least one height-adjustable cushion portion which, in the non-usage position of the backrest, can be moved by means of a four-bar mechanism having four articulation axes from a lower armrest non-usage position into an upper first armrest position to form an armrest for the second vehicle seat. The articulation axes extend transversely to the seat direction and are inclined with respect to a horizontal transverse to the seat direction. In an alternative embodiment, the articulation axes extend in the seat direction in the non-usage position of the backrest.

15 Claims, 4 Drawing Sheets

U.S. PATENT DOCUMENTS

| | | | |
|---|---|---|---|
| 5,588,700 A * | 12/1996 | Homier | 297/238 |
| 5,722,724 A * | 3/1998 | Takei et al. | 297/238 |
| 5,951,084 A * | 9/1999 | Okazaki et al. | 296/37.16 |
| 6,547,323 B1 * | 4/2003 | Aitken et al. | 297/113 |
| 6,840,577 B2 * | 1/2005 | Watkins | 297/284.9 |
| 6,918,160 B1 * | 7/2005 | Clark | 16/370 |
| 7,341,302 B2 | 3/2008 | Slade | |
| 7,677,656 B2 * | 3/2010 | Saberan et al. | 297/188.04 |
| 2007/0216186 A1 * | 9/2007 | Sumida et al. | 296/64 |
| 2009/0230712 A1 * | 9/2009 | Maier et al. | 296/65.13 |
| 2009/0250983 A1 * | 10/2009 | Maier et al. | 297/232 |
| 2009/0250984 A1 * | 10/2009 | Maier | 297/232 |
| 2009/0250985 A1 * | 10/2009 | Maier | 297/257 |
| 2009/0250987 A1 * | 10/2009 | Maier | 297/257 |
| 2009/0267398 A1 * | 10/2009 | Na | 297/378.1 |
| 2010/0156128 A1 | 6/2010 | Dexter et al. | |

FOREIGN PATENT DOCUMENTS

| | | |
|---|---|---|
| DE | 20000479 U1 | 6/2001 |
| DE | 10212548 A1 | 10/2003 |
| EP | 0592426 A1 | 4/1994 |
| EP | 0943482 A2 | 9/1999 |
| EP | 0943483 A2 | 9/1999 |
| EP | 1728673 A1 | 12/2006 |
| EP | 1731351 A1 | 12/2006 |
| GB | 2458819 A | 10/2009 |
| GB | 2459029 A | 10/2009 |
| JP | 06181828 A * | 7/1994 |
| JP | 2005112067 A | 4/2005 |
| WO | 03095263 A2 | 11/2003 |
| WO | 2007019290 A1 | 2/2007 |

* cited by examiner

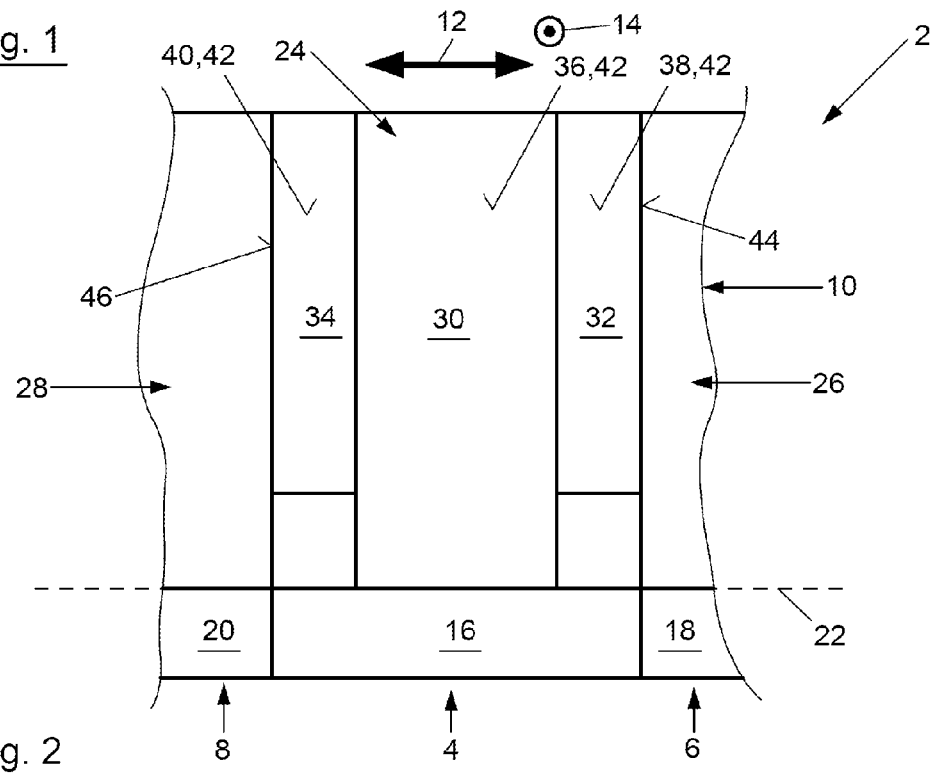
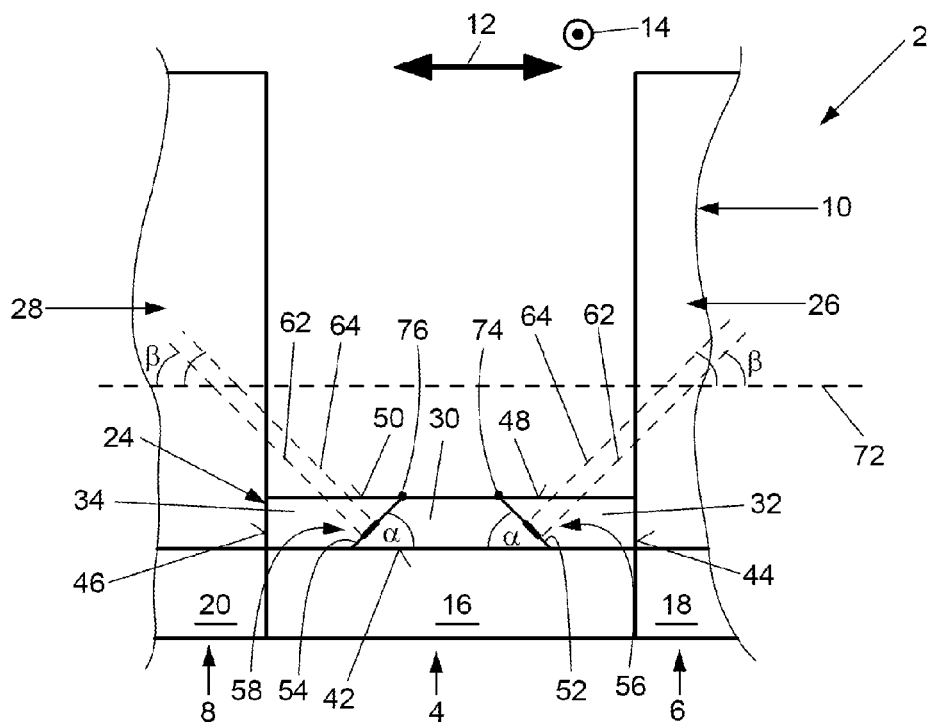

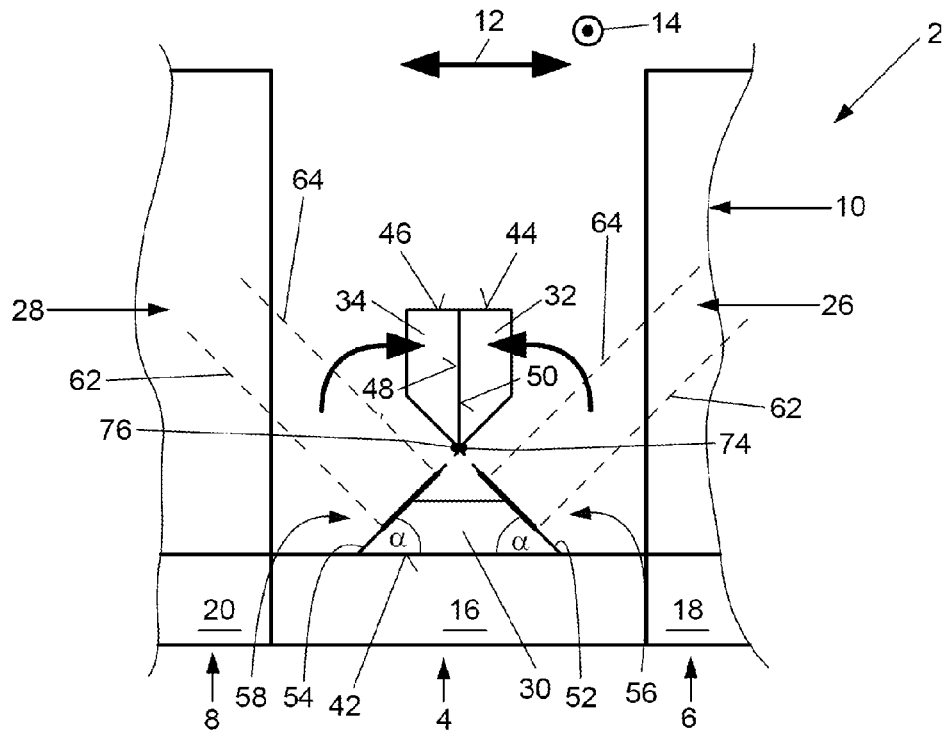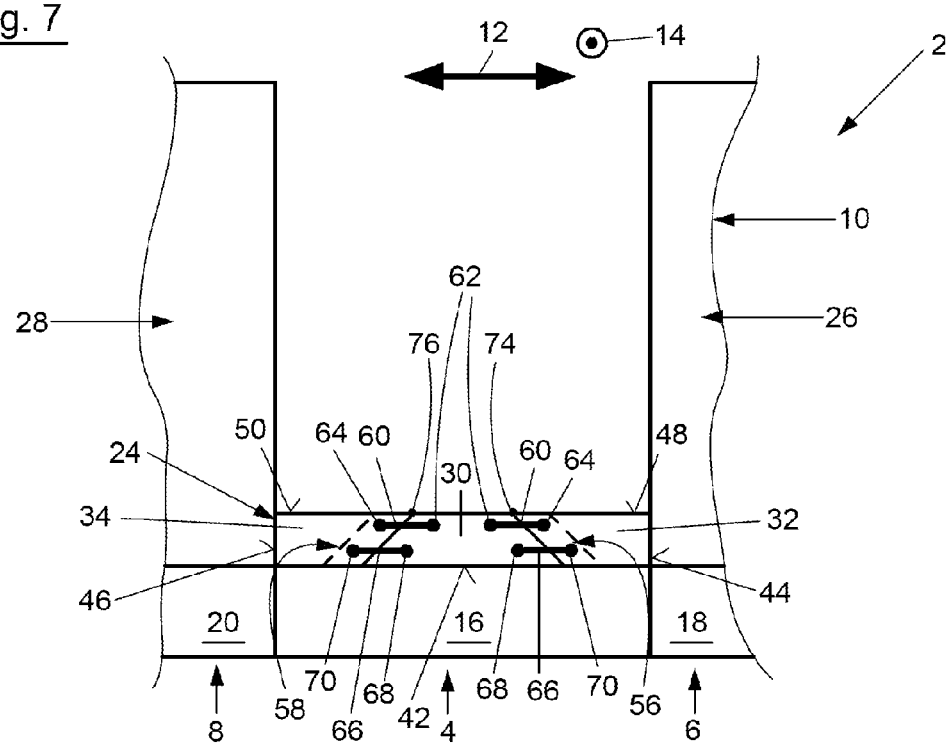

SEAT ARRANGEMENT COMPRISING TWO VEHICLE SEATS IN A SEAT ROW

CROSS-REFERENCE TO RELATED APPLICATION

This application claims priority to German Patent Application No. 102008004232.3-14, filed Jan. 14, 2008, which is incorporated herein by reference in its entirety.

TECHNICAL FIELD

The present invention relates to a seat arrangement comprising a first and a second vehicle seat, which are disposed adjacent to one another in a seat row and of which the first vehicle seat has a backrest, which can be pivoted from a substantially upright usage position in the seat direction forward into a substantially horizontal non-usage position, and the backrest comprises at least one height-adjustable cushion portion which, in the non-usage position of the backrest, can be moved by means of a four-bar mechanism having four articulation axes from a lower armrest non-usage position into an upper first armrest position to form an armrest for the second vehicle seat.

BACKGROUND

Known from the prior art are seat arrangements, in particular seat arrangements for automobiles, comprising two adjacently disposed vehicle seats, and one of the two vehicle seats has a backrest, which can be pivoted forward into a non-usage position. Thus, EP 0 943 483 B1 describes a seat arrangement comprising at least two adjacently disposed seats within a seat row of an automobile. One of the seats has a backrest which can be pivoted from a substantially upright usage position in the seat direction forward into a substantially horizontal non-usage position. The backrest is composed of a central cushion portion as well as two lateral height-adjustable cushion portions, which are each provided on one side of the central cushion portion. The two height-adjustable cushion portions are disposed on a rearward supporting plate of the central cushion portion. The supporting plate itself is fastened to the rear side of the central cushion portion by means of a four-bar mechanism having four articulation axes so that the supporting plate together with the height-adjustable cushion portions can be pivoted from a lower position into an upper position when the backrest is located in the forward-folded non usage position. Furthermore, the height-adjustable cushion portions disposed on the supporting plate can then be pivoted upwards in each case about a pivot axis that extends in the seat direction, so that these jointly form an armrest for an adjacently disposed vehicle seat. In the known seat arrangement, the articulation axes of the four-bar mechanism extend transversely or at right angles to the seat direction.

The known seat arrangement has proved useful but is disadvantageous insofar as it is difficult to handle in particular when moving the height-adjustable cushion portions from a non-usage position into the armrest position.

It is therefore at least one object of the present invention to provide a seat arrangement of the generic type in which the handling of the seat arrangement, in particular the transfer of the height-adjustable cushion portions from an armrest non-usage position into an armrest position, is simplified. In addition, other objects, desirable features, and characteristics will become apparent from the subsequent detailed description and the appended claims, taken in conjunction with the accompanying drawings and this background.

BACKGROUND

The seat arrangement according to an embodiment of the invention comprises at least a first and a second vehicle seat, which are disposed next to one another (i.e., adjacent to one another in a seat row. The first vehicle seat has a backrest, which can be pivoted from a substantially upright usage position in which the vehicle occupant can be seated on the first vehicle seat, in the seat direction forward into a substantially horizontal non-usage position. The backrest of the first vehicle seat comprises at least one height-adjustable cushion portion. In the non-usage position of the backrest, the height-adjustable cushion portion can be moved by means of a four-bar mechanism having four articulation axes from a lower armrest non-usage position into an upper first armrest position. In the upper first armrest position, the height-adjustable cushion part forms an armrest for the adjacent second vehicle seat. According to an embodiment of the invention, the articulation axes extend transversely to the seat direction but are inclined with respect to a horizontal transverse to the seat direction. Alternatively, the articulation axes extend in the seat direction in the non-usage position of the backrest.

In both alternative embodiments of the seat arrangement according to an embodiment of the invention, there is the advantage that due to the arrangement or orientation of the articulation axes, an upward movement of the height-adjustable cushion portions is simultaneously coupled with a sideward movement of the cushion portions. The handling of the cushion portions during their movement from the armrest non-usage position into the upper first armrest position is hereby simplified, especially as the cushion portions need not be moved initially upward and then to the side to arrive at the first armrest position, as is the case, for example in the seat arrangement known from EP 0 943 482 B1. Operation is therefore substantially more convenient and simpler.

In a preferred embodiment of the seat arrangement, the articulation axes of the four-bar mechanism are disposed in such a manner that in the first armrest position transverse to the seat direction, the cushion portion is more remote from the second vehicle seat than in the armrest non-usage position. This ensures that during their movement from the armrest usage position into the first armrest position, the height-adjustable cushion portions of the first vehicle seat do not collide with a component of the adjacent second vehicle seat such as, for example, its seat portion or its backrest. Consequently, the two vehicle seats can be arranged very closely adjacent to one another without needing to provide a particularly large gap there between. The seat arrangement according to the invention therefore makes it possible to have a particularly close arrangement of the adjacent vehicle seats within the seat row.

In a further preferred embodiment of the seat arrangement, the articulation axes are inclined at an angle of about 5° to about 85°, preferably at an angle of about 45°, with respect to the horizontal. Thus, at a preferred angle of 45° it is ensured that during its movement from the armrest non-usage position into the upper armrest position, the height-adjustable cushion portion is always displaced by the same distance in the height direction and the transverse direction.

In order to allow a particularly flexible usage of the height-adjustable cushion portion, in a particularly preferred embodiment of the seat arrangement, the cushion portion is further pivotably disposed about a pivot axis on the four-bar mechanism which in the first armrest position extends in the seat direction, and the cushion portion can be pivoted from the first armrest position about the pivot axis into a second armrest position.

In an advantageous embodiment of the seat arrangement, the cushion portion has a rear side and a front side, and in the usage position of the backrest the front side is configured as a part of a backrest surface pointing in the seat direction and in the armrest position of the cushion portion, the rear side forms an upwardly pointing first armrest surface.

According to a further advantageous embodiment of the seat arrangement, the cushion portion further comprises an outer side facing the second vehicle seat in the usage position, which the outer side forms an upwardly pointing second armrest surface in the second armrest position of the cushion portion. Thus, for example, the rear side of the cushion portion and the outer side of the cushion portion can be differently configured so that in the first armrest position a softer or harder armrest surface is created compared with that in the second armrest position of the cushion portion.

In a further preferred embodiment of the seat arrangement, the backrest further comprises a central cushion portion, and the mutually facing and optionally mutually adjacent sides of the central cushion portion and the height-adjustable cushion portion are inclined with respect to the backrest surface. In this case, the angle of inclination is preferably between about 5° and about 85°. However, an angle of about 45° is particularly preferable. In any case, the inclination with respect to the backrest surface, which excludes a transverse extension at an angle of about 90°, makes it possible for the height-adjustable cushion portions to be moved from the armrest non-usage position into the upper first armrest position by means of the four-bar mechanism without these colliding with the central cushion part. The inclination of the articulation axes with respect to the horizontal should thereby correspond to the inclination of the mutually facing sides of the cushion portions.

In a further preferred embodiment of the seat arrangement according to the invention, the first vehicle seat has two height-adjustable cushion portions configured as wing rests, and the one cushion portion is facing the second vehicle seat and the other cushion portion is facing the third vehicle seat, while the first vehicle seat is disposed between the second and third vehicle seat. In this embodiment, the two height-adjustable cushion portions can be moved independently of one another by means of the relevant four-bar mechanism from the armrest non-usage position into the upper first or second armrest position. In contrast, the seat arrangement known from EP 0 943 482 B1 only allows a joint movement of the two cushion portions into the first armrest position even when one of the vehicle passengers on the second or third vehicle seat does not require such an armrest or even perceives this as disturbing. Thus, a substantially more flexible usage of the cushion portions is possible.

According to a further preferred embodiment of the seat arrangement, the rear sides of the two cushion portions abut against one another in the second armrest position. Thus, in the second armrest position, the two cushion portions can, for example, form a cohesive armrest surface so that a larger and cohesive armrest surface can be produced both for the first and also for the second vehicle seat.

In a further advantageous embodiment of the seat arrangement, the four-bar mechanism comprises a first pivot lever, which is arranged on the one hand pivotably about a first articulation axis on the backrest and on the other hand pivotably about a second articulation axis on the cushion portion, and a second pivot lever, which is arranged on the one hand pivotably about a third articulation axis on the backrest and on the other hand pivotably about a fourth articulation axis on the cushion portion. Both the first and the third articulation axis and also the second and the fourth articulation axis can thereby be provided, for example, on a common supporting part, which is disposed on the backrest or on the cushion portion.

In principle, the first and second pivot lever should have the same or at least substantially the same length so that the distance between the first articulation axis and the second articulation axis as well as the distance between the third articulation axis and the fourth articulation axis is the same. This has the advantage that the same component can be used in each case for the first and second pivot lever. However, should an inclination of the cushion portion in the first or second armrest position be desired, for example, in a further preferred embodiment of the seat arrangement, the first and second pivot levers have different lengths. Thus, for example, the pivot lever disposed further forward in the seat direction could be configured to be longer than the pivot lever disposed further backward in the seat direction, so that the cushion portion in the first or second armrest position is inclined upward in the seat direction.

In a further advantageous embodiment of the seat arrangement, the articulation axes of a four-bar mechanism are arranged parallel to one another.

According to a further advantageous embodiment of the seat arrangement, the articulation axes of a four-bar mechanism are arranged at right angles to the seat direction.

BRIEF DESCRIPTION OF THE DRAWINGS

The embodiments of the invention will hereinafter be described in conjunction with the following drawing figures, wherein like numerals denote like elements, and:

FIG. 1 is a schematic front view of the seat arrangement according to an embodiment of the invention with the backrest in the usage position;

FIG. 2 shows the seat arrangement according to FIG. 1 in a first embodiment with the backrest in the non-usage position;

FIG. 6 shows the seat arrangement from FIG. 4 with the cushion portions in a second armrest position;

FIG. 7 shows the seat arrangement according to FIG. 1 in a second embodiment with the backrest in the non-usage position;

DETAILED DESCRIPTION

The following detailed description is merely exemplary in nature and is not intended to limit application and uses. Furthermore, there is no intention to be bound by any theory presented in the preceding background and summary or the following detailed description.

Figure 8:
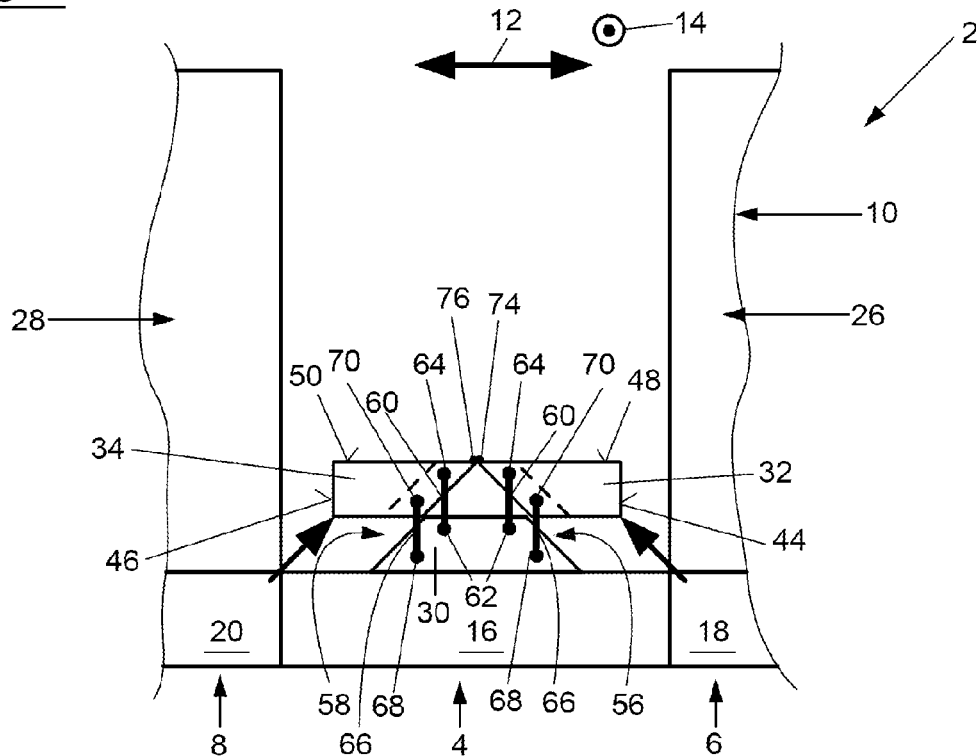
FIG. 8 shows the seat arrangement from FIG. 7 with the cushion portions in a first armrest position.
Figure 9:
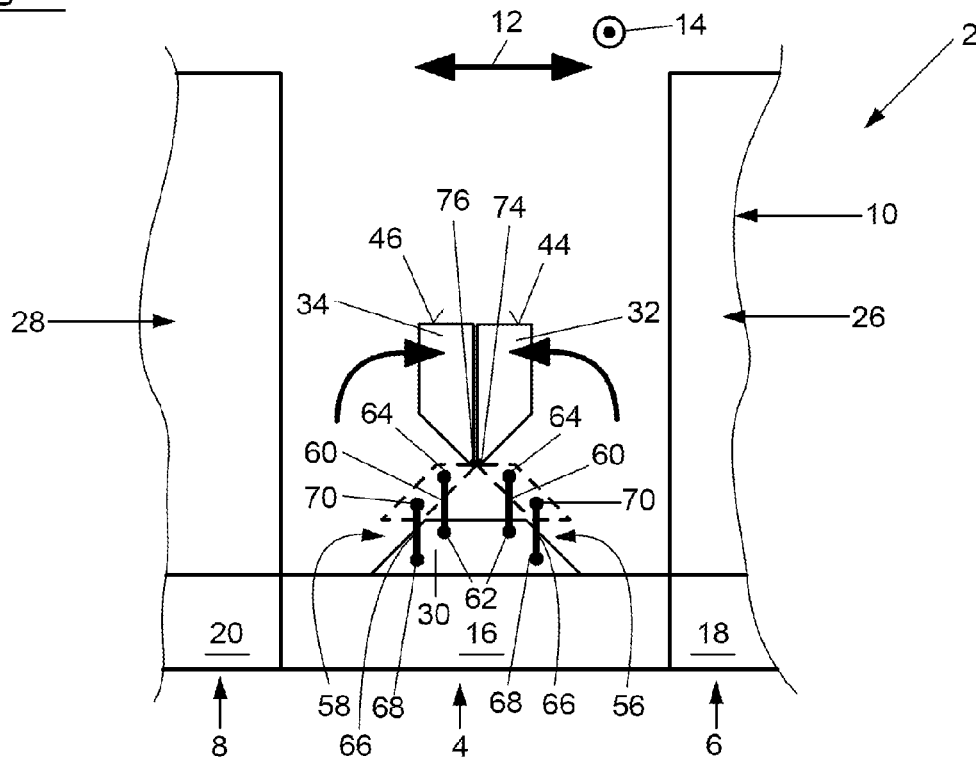
FIG. 9 shows the seat arrangement from FIG. 8 with the cushion portions in a second armrest position.

FIG. 1 shows a front view of the seat arrangement 2 according to an embodiment of the invention, which applies both to the first embodiment according to FIG. 2 to FIG. 6 and also to the second embodiment according to FIG. 7 to FIG. 9. The seat arrangement 2 comprises a first vehicle seat 4, a second vehicle seat 6, and a third vehicle seat 8, which are arranged adjacent to one another in a seat row 10 in transverse direction 12. In this case, the first vehicle seat 4 is disposed between the second vehicle seat 6 and the third vehicle seat 8, the seat direction 14 of the vehicle seats 4, 6, 8 being identical. In FIG. 1 the seat direction 14 corresponds to the normal of the drawing sheet.

The vehicle seats 4, 6, 8 each comprises a seat portion 16, 18, 20 as well as a backrest 24, 26, 28 disposed pivotally about a pivot axis 22 on the seat portion 16, 18, 20. The backrests 24, 26, 28 can be pivoted independently of one another about the pivot axis 22. The backrest 24 of the first vehicle seat 4 is substantially composed of a central cushion portion 30, as well as two height-adjustable cushion portions 32, 34, and the height adjustment will be discussed in detail subsequently. The height-adjustable cushion portions 32, 34 are configured as so-called wing rests, the one cushion portion 32 facing the second vehicle seat 6 and the other cushion portion 34 facing the third vehicle seat 8.

The front side 36 of the central cushion portion 30 together with the front sides 38, 40 of the height-adjustable cushion portions 32, 34 forms a common backrest surface 42 when the backrest 24 is located in the usage position shown in FIG. 1. Furthermore, the cushion portion 32 has an outer side 44 facing the second vehicle seat, while the other cushion portion 34 has an outer side 46 facing the third vehicle seat 8. Furthermore, the cushion portions 32, 34 each have a rear side 48, 50 which faces away from the corresponding front side 38, 40 and cannot be seen in FIG. 1.

Figure 3:
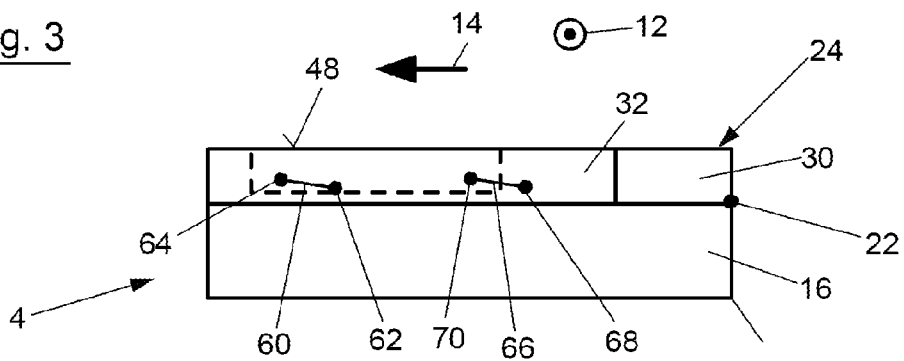
FIG. 3 shows a side view of the seat arrangement from FIG. 2.

A first embodiment of the seat arrangement 2 from FIG. 1 is described hereinafter with reference to FIG. 2 to FIG. 6. In FIG. 2 the backrest 24 of the first vehicle seat 4 is pivoted about the pivot axis 22 forward in seat direction 14 onto the corresponding seat portion 16, so that the backrest 24 is located in a substantially horizontal non-usage position. As is apparent from FIG. 2, the mutually facing and mutually adjacent sides 52, 54 of the central cushion portion 30 and the height-adjustable cushion portions 32 or 34 are inclined at an angle α with respect to the backrest surface 42 of the backrest 24 of the first vehicle seat 4. In the present embodiment the angle is α=about 45°, and this angle α should in principle be between about 5° and about 85°. Furthermore, a four-bar mechanism 56 or 58, which will be described in further detail with reference to FIG. 3, is provided in each case between the sides 52 or 54.

The four-bar mechanism 56 comprises a front first pivot lever 60 in seat direction 14, which is arranged on the one hand pivotably about a first articulation axis 62 on the backrest 24 or the central cushion portion 30 and on the other hand pivotably about a second articulation axis 64 on the cushion portion 32, and a second pivot lever 66, which is arranged on the one hand pivotably about a third articulation axis 68 on the backrest 24 or the central cushion portion 30 and on the other hand pivotably about a fourth articulation axis 70 on the cushion portion 32. In the side view in FIG. 3, the first, second, third, and fourth articulation axes 62, 64, 68, 70 form the four-bar mechanism 56, and the second articulation axis 64 and the fourth articulation axis 70 may be disposed on a common supporting part, which in turn is fastened to the cushion portion 32, as is indicated by the dashed line in FIG. 3.

In order to subsequently obtain an inclined armrest, the first pivot lever 60 may be configured to be shorter or longer than the second pivot lever 66, but the present description is restricted to an embodiment in which the first pivot lever 60 and the second lever 66 have the same length, so that the distance between the first articulation axis and the second articulation axis 62, 64 and the distance between the third articulation axis and the fourth articulation axis 68, 70 is the same.

The articulation axes 62, 64, 68, 70 of the four-bar mechanism 56 are arranged parallel to one another and extend at right angles to the seat direction 14. Nevertheless, the articulation axes 62, 64, 68, 70 are inclined at an angle β with respect to a horizontal 72, which extends in transverse direction 12 transverse to the seat direction 14 and is indicated in FIG. 2, the angle being β=45° in this embodiment and thus corresponding to the previously described angle α. The explanations presented previously in relation to the four-bar mechanism 56 apply accordingly to the four-bar mechanism 58, this merely being disposed as a mirror image, as is apparent from FIG. 2.

The height-adjustable cushion portions 32, 34 are furthermore disposed pivotably about a pivot axis 74 or 76 on the corresponding four-bar mechanism 56 or 58 or a corresponding supporting part of the four-bar mechanism 56 or 58, wherein in the non-usage position of the backrest 24 shown or in the first armrest position of the cushion portions 32, 34, the pivot axis 74, 76 extends in the seat direction 14.

Figure 4:
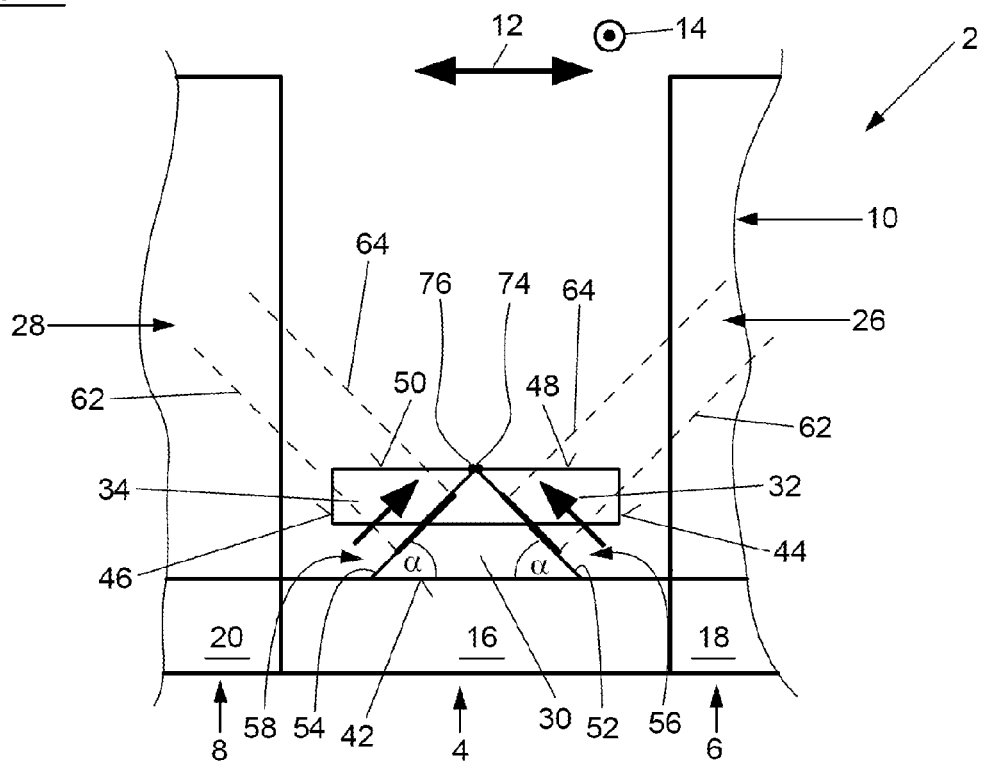
FIG. 4 shows the seat arrangement from FIG. 2 with the cushion portions in a first armrest position.
Figure 5:
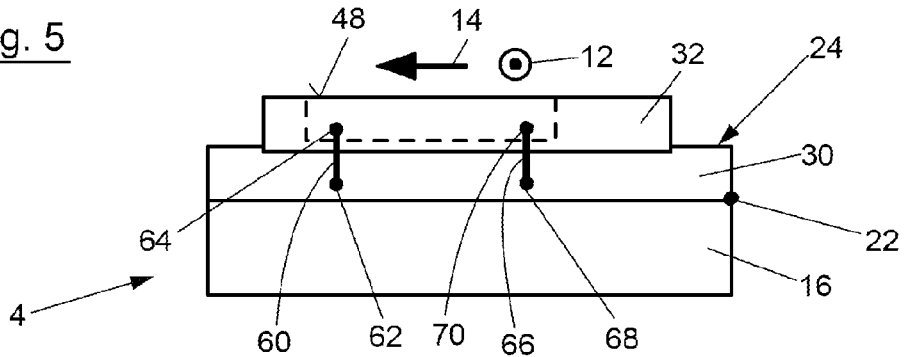
FIG. 5 shows a side view of the seat arrangement from FIG. 4.

Further features of the seat arrangement 2 in the first embodiment and its mode of operation are explained in further detail hereinafter with reference to FIG. 2 to FIG. 6. Due to the four-bar mechanism 56, 58, the cushion portions 32, 34 can moved from the lower armrest non-usage position shown in FIG. 2 into an upper first armrest position, which is shown in FIG. 4 and FIG. 5. In FIG. 4 and FIG. 5 the cushion portions 32, 34 are moved simultaneously into the upper first armrest position, but these may also be moved into the upper first armrest position independently of one another. Due to the inclination of the articulation axes 62, 64, 68, 70 of the four-bar mechanism 56, 58, the cushion portions 32, 34 are moved simultaneously in transverse direction 12 during raising, as is indicated by the arrows in FIG. 4. Thus, in the first armrest position, the cushion portion 32 is more remote from the second vehicle seat 6 in the transverse direction than in the armrest non-usage position of FIG. 2 and FIG. 3. Furthermore, in the first armrest position in transverse direction 12, the cushion portion 34 is more remote from the third vehicle seat 8 than in the armrest non-usage position.

The movement sequence indicated in FIG. 4 has the advantage that a collision between the moving cushion portions 32, 34 and a part of the respectively adjacent vehicle seat 6, 8 is largely eliminated, so that a relatively closely adjacent arrangement of vehicle seats 4, 6, 8 in transverse direction 12 is possible. Furthermore, the first armrest position is reached particularly rapidly due to coupling of the movements in the height direction and transverse direction 12, so that the handling of the cushion portions 32, 34 is permanently simplified. In the first armrest position the rear sides 48, 50 of the cushion portions 32, 34 each form an upwardly pointing first armrest surface, so that an armrest is created in each case both for the second vehicle seat 6 and also for the third vehicle seat 8.

If a particularly high armrest position should be desired, the cushion portions 32, 34 can be pivoted from the first armrest position in FIG. 4 and FIG. 5 about the respective pivot axis 74 or 76 upward into a second armrest position, which is shown in FIG. 6. In the second armrest position of the cushion portions 32, 34, the outer sides 44, 46 of the cushion portions 32, 34 form an upwardly pointing second armrest surface, while the rear sides 48, 50 of the two cushion portions 32, 34 abut against one another in the second armrest position. It also applies here that the cushion portions 32, 34 may be pivoted into the second armrest position from the first armrest position independently of one another.

A second embodiment of the seat arrangement 2 from FIG. 1 is described hereinafter with reference to FIG. 7 to FIG. 9, and only the differences from the second embodiments are discussed and the above description otherwise applies. In contrast to the first embodiment, the articulation axes 62, 64, 68, 70 do not extend in transverse direction 12 transverse to the seat direction 14, but in the seat direction 14 when the backrest 24 is located in the non-usage position shown in FIG. 7. By raising the cushion portions 32, 34, these are in turn moved in the height direction and also in transverse direction 12, as is indicated by means of the arrows in FIG. 8, where FIG. 8 shows the cushion portions 32, 34 in the first armrest position. The cushion portions 32, 34 can then again be pivoted about the relevant pivot axes 74 or 76 upward into the second armrest position shown in FIG. 9.

A collision-free movement of the cushion portions 32, 34 into the first and second armrest position is also possible in the second embodiment, whereby the first armrest position may be reached particularly rapidly and simply.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed summary and description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A seat arrangement, comprising,
a first vehicle seat comprising a backrest; and
a second vehicle seat adjacent to the first vehicle seat in a seat row,
wherein the backrest is adapted to pivot from a substantially upright usage position in a seat direction forward into a substantially horizontal non-usage position in which at least one of an upper surface and a lower surface of the backrest substantially defines a horizontal plane, wherein the backrest further comprises a height-adjustable cushion portion which, in the substantially horizontal non-usage position, can be moved with a four-bar mechanism having four articulation axes from a lower armrest position into an upper first armrest position to form an armrest for the second vehicle seat,
wherein the four articulation axes extend transversely to the seat direction and are inclined with respect to the horizontal plane.

2. The seat arrangement according to claim 1, wherein the four articulation axes of the four-bar mechanism are disposed in such a manner that in a first armrest position transverse to the seat direction, the height-adjustable cushion portion is more remote from the second vehicle seat than in the armrest non-usage position.

3. The seat arrangement according to one of claims 1, wherein the four articulation axes are inclined at an angle (β) of about 5° to 85°.

4. The seat arrangement according to claim 1, wherein the height-adjustable cushion portion is further pivotably disposed about a pivot axis on the four-bar mechanism, wherein the height-adjustable cushion in a first armrest position extends in the seat direction, wherein the height-adjustable cushion portion is pivotable from the first armrest position about the pivot axis into a second armrest position.

5. The seat arrangement according to claim 1, wherein the height-adjustable cushion portion has a rear side and a front side, wherein in a usage position of the backrest the front side is configured as a part of a backrest surface pointing in the seat direction and in a first armrest position of the height-adjustable cushion portion the rear side forms an upwardly pointing first armrest surface.

6. The seat arrangement according to claim 5, wherein the height-adjustable cushion portion further comprises an outer side facing the second vehicle seat in the usage position, and the outer side forms an upwardly pointing second armrest surface in a second armrest position of the height-adjustable cushion portion.

7. The seat arrangement according to claim 5, wherein the backrest further comprises a central cushion portion, wherein mutually facing and mutually adjacent sides of the central cushion portion and the height-adjustable cushion portion are inclined with respect to the backrest surface at an angle (α) between about 5° and about 85°.

8. The seat arrangement according to claim 1, wherein the first vehicle seat has a first height-adjustable cushion portion and a second height-adjustable cushion configured as wing rests, wherein the first height-adjustable cushion portion is facing the second vehicle seat and the second height-adjustable cushion portion is facing a third vehicle seat, and the first vehicle seat is disposed between the second vehicle seat and third vehicle seat.

9. The seat arrangement according to claim 8, wherein a rear side of the first height-adjustable cushion portion and a rear side of the second height-adjustable cushion portion abut against one another in a second armrest position.

10. The seat arrangement according to claim 1, wherein the four-bar mechanism comprises a first pivot lever pivotably arranged about a first articulation axis on the backrest and pivotably arranged about a second articulation axis on the height-adjustable cushion portion, and a second pivot lever pivotably arranged about a third articulation axis on the backrest and pivotably arranged about a fourth articulation axis on the height-adjustable cushion portion.

11. The seat arrangement according to claim 10, wherein the first pivot lever and the second pivot lever have different lengths.

12. The seat arrangement according to claim 1, wherein the four articulation axes of the four-bar mechanism are arranged at least substantially parallel to one another.

13. The seat arrangement according to claim 1, wherein the four articulation axes of the four-bar mechanism are arranged at substantially right angles to the seat direction.

14. The seat arrangement according to claim 1, wherein the four articulation axes are inclined at an angle (β) of about of 45° with respect to the horizontal.

15. The seat arrangement according to claim 5, wherein the backrest further comprises a central cushion portion, wherein mutually facing and mutually adjacent sides of the central cushion portion and the height-adjustable cushion portion are inclined with respect to the backrest surface at an angle (α) of about 45°.

* * * * *